No. 786,297. PATENTED APR. 4, 1905.
O. W. KENWORTHY.
WINDMILL.
APPLICATION FILED DEC. 23, 1904.
2 SHEETS—SHEET 1.
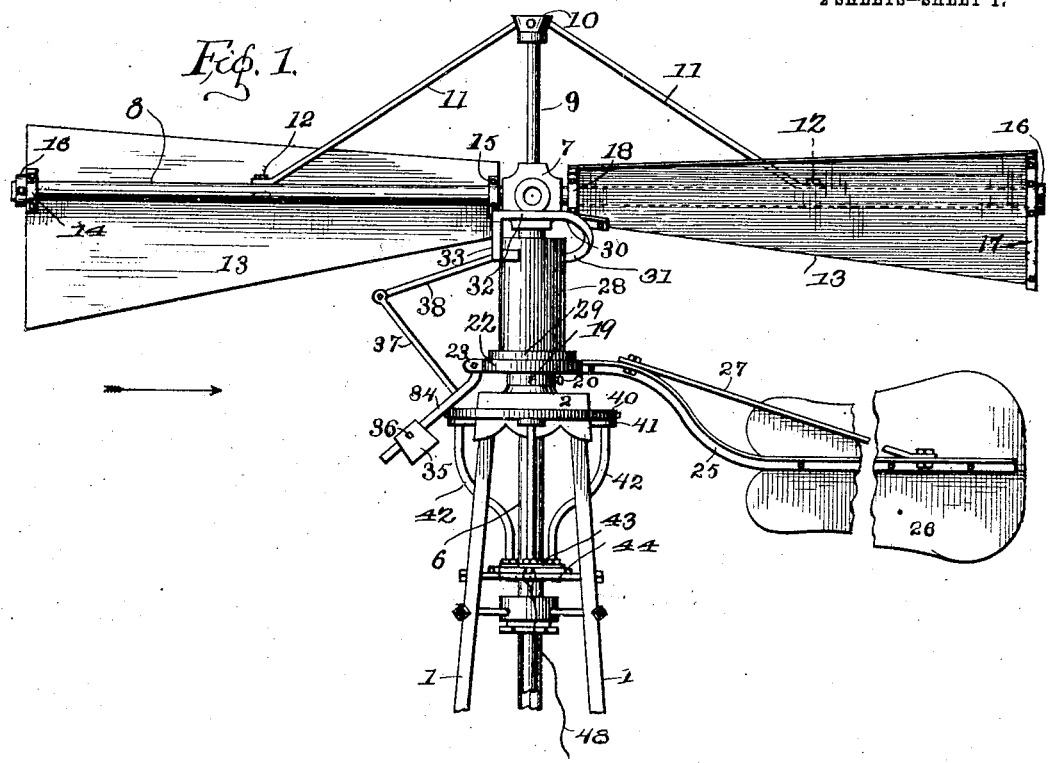
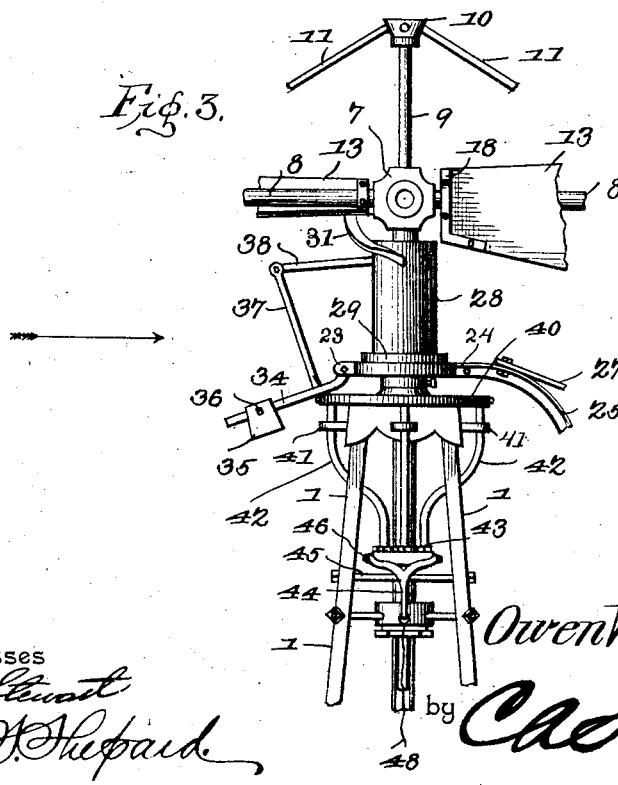
Witnesses
Owen W. Kenworthy,
Inventor.
Attorneys No. 786,297. PATENTED APR. 4, 1905.
O. W. KENWORTHY.
WINDMILL.
APPLICATION FILED DEC. 23, 1904.
2 SHEETS—SHEET 2.
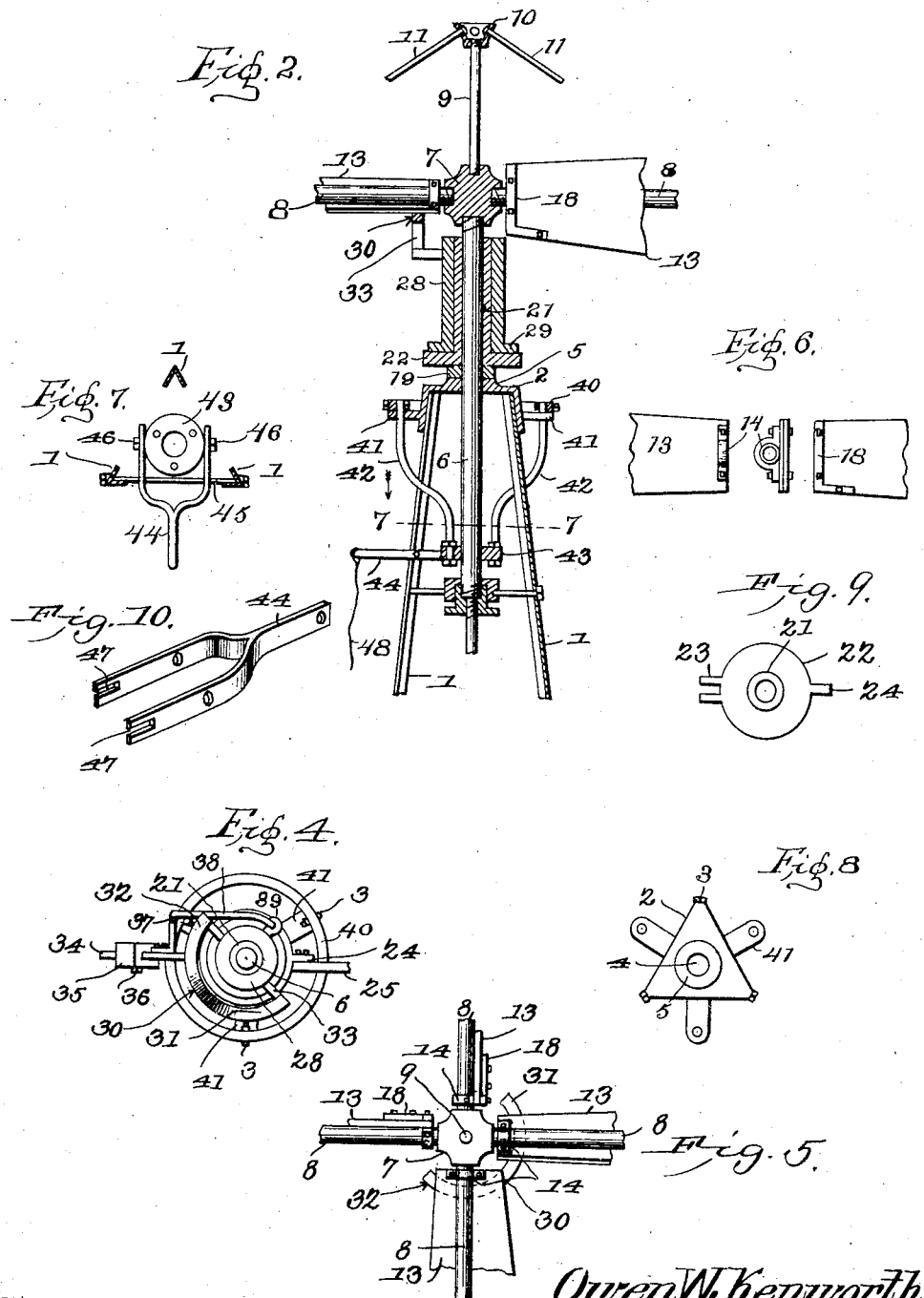
Witnesses
E. H. Stewart
H. S. Shepard.
Owen W. Kenworthy,
Inventor.
by C. A. Snow & Co.
Attorneys No. 786,297. Patented April 4, 1905.

UNITED STATES PATENT OFFICE.

OWEN W. KENWORTHY, OF OSKALOOSA, IOWA.

WINDMILL.

SPECIFICATION forming part of Letters Patent No. 786,297, dated April 4, 1905.

Application filed December 23, 1904. Serial No. 238,118.

*To all whom it may concern:*

Be it known that I, OWEN W. KENWORTHY, a citizen of the United States, residing at Oskaloosa, in the county of Mahaska and State of Iowa, have invented a new and useful Windmill, of which the following is a specification.

This invention relates to windmills, and has for its object to provide certain new and useful improvements including a novel arrangement of horizontal wind-wheel wherein the blades are automatically feathered when turned into the wind, so as to avoid resistance to the operation of the wheel, and automatically returned to their active upright positions without the aid of springs, weights, or other extraneous means whereby the wheel is materially simplified and runs in a regular and effective manner.

Another object of the invention is to effect automatic shifting of the feathering means in accordance with the direction of the wind in order that the blades of the wheel may always present themselves in proper relation to the direction of the wind to obtain the most effective rotation of the wheel.

It is furthermore designed to effect manual feathering of the blades when it is desired to throw the wheel out of operation and to provide for conveniently controlling the blade-feathering means from the ground or other position remote from the mill, so as to avoid the necessity of climbing to the top of the tower when it is desired to throw the wheel out of operation.

Another object of the invention is to materially simplify the mounting of the wheel upon the rotary vertical shaft of the mill and to arrange the blade-feathering means in compact form at the top of the tower concentrically with the shaft, so as not to be affected by the rotary shifting of the shaft and the wheel occasioned by a change in the direction of the wind.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a side elevation of a windmill embodying the features of the present invention with the wheel in its operative condition. Fig. 2 is a sectional view at right angles to Fig. 1. Fig. 3 is a similar view showing the wheel in its inoperative position. Fig. 4 is a fragmentary top plan view of Fig. 3. Fig. 5 is a detail plan view of Fig. 3 with the wheel in the wind. Fig. 6 is a view in detail of the inner and outer ends of the blades of the wind-wheel. Fig. 7 is a detail cross-sectional view on the line 7 7 of Fig. 2. Fig. 8 is a detail top plan view of the tower. Fig. 9 is a detail plan view of the shiftable carrier for the vane. Fig. 10 is a detail perspective view of the controlling-lever for throwing the blades of the wheel into inoperative positions.

Like characters of reference designate corresponding parts in each and every figure of the drawings.

For the support of the operating parts of the present windmill there is provided a tower made up of three upwardly-converged standards 1, preferably in the nature of angle-bars, the upper ends of which fit within the corners of a triangular flange-cap 2, to which the standards are connected by suitable fastenings 3. The center of this cap is pierced by an opening 4, surrounded by an upstanding boss 5, and through this central opening extends an upright rotary shaft 6, which projects a suitable distance above and below the top of the tower. Upon the top of the shaft is a hub 7, preferably in the nature of a six-way coupling threaded upon the shaft and having four radial arms or spokes 8, engaged with the horizontally-disposed threaded sockets or ways of the coupling. While only four spokes or arms have been shown, it will of course be understood that a greater number may be employed, if desired; but four is deemed sufficient. A standard 9 rises from the top of the coupling and is provided upon its upper end with a hollow upwardly-flared head 10, from which extends braces 11, which diverge downwardly and outwardly and are connected to the respective arms 8, as indicated at 12. Upon each arm of the wheel is a blade 13, which is provided upon what will be termed its "back" with bearings 14 and 15, located, respectively, at its outer and inner ends and in longitudinal alinement above the longitudinal center of the blade, the arm or spoke 8 being loosely received within the bearings, whereby the plate is pivotally hung upon the arm and normally assumes an upright position in view of the preponderance of weight which lies below the arm. A suitable collar 16 is provided upon the outer end of the arm 8 at the outer end of the blade, whereby the latter is confined between the collar and the hub 7, so as to prevent endwise displacement of the blade. The outer end of each blade is provided upon its front side with a transverse cleat or brace 17, preferably in the nature of a metal strap, and a substantially L-shaped wear-plate 18 is provided at the inner end of the blade upon its front side with the lower or substantially horizontal member of the blade extending along the lower edge of the blade for a purpose as will hereinafter appear.

Upon the top of the cap or head 2 of the tower there is a collar 19, which is fixed to the shaft 6 by a suitable set-screw 20, and upon this collar is a rotary tube 21, through which the shaft 6 loosely passes, and upon the lower end of this tube is an external annular flange 22, provided at diametrically opposite sides with radial ears 23 and 24. A substantially radial arm 25 is secured to the ear 24 and is provided at its outer end with an upright vane 26, there being a brace-bar 27 extending between the inner and outer end portions of the arm 25. It will here be noted that the tubular member 21 constitutes a carrier for the vane 26 and is capable of being rotatably shifted about the shaft 6 as a center by the swinging movements of the vane under the influence of changes in the direction of the wind.

An open-ended sleeve 28 rotatably embraces the tubular carrier 21 and is provided at its lower end with an external annular flange 29, supported upon the flange 22 of the carrier. Carried by the upper portion of the sleeve 28 is a rail 30, which is substantially semicircular in shape and constitutes a cam having an upwardly-inclined initial portion 31 and a substantially horizontal terminal portion 32 lying above the top of the sleeve 28, there being a bracket 33 rising from the sleeve for the support of the upper end of the cam. It will here be explained that the top of the sleeve 28 is below the path of the inner end portions of the lower edges of the blades and the latter are beveled or inclined inwardly or upwardly, so as to clear the top of the sleeve. While the top of the sleeve 28 is out of the path of the lower edges of the blades, the cam 30 is in onehalf of its circular path, so that when the lower edge of each blade engages the lower portion of the cam said blade is tilted as it travels forwardly until it reaches the horizontal portion 32 of the cam, whereupon the blade will be in a substantially horizontal position edgewise to the wind, and thereby automatically feathered so as to offer no resistance to the rotation of the wheel while the blade is traveling into the wind. When the blade reaches the upper extremity of the cam, it trips therefrom and gravitates into its normal upright position endwise to the wind, and as the wheel continues to rotate the back of the blade will come into the path of the wind and be acted thereon to rotate the wheel and the shaft 6 of the mill. In addition to bracing the arms 8 each brace 11 constitutes a stop for engagement with the top of the adjacent blade to prevent rotation of the blade upon its arm under the action of the wind, whereby the blade is held in an upright position, so as to obtain the full effect of the wind. It will now be understood that the lower or horizontal member of the wear-plate 18 is arranged to engage the cam 30, so as to avoid wear upon the blade, which is preferably formed of wood, although it may be of sheet metal, if desired.

As the sleeve 28 is rotatable upon the carrier 21, it is necessary to normally maintain the sleeve and the cam in a predetermined relation with respect to the vane 26 in order that the blades may be properly feathered as they travel into the wind. This is accomplished by means of a lever 34, fulcrumed upon the ear 23 of the flange of the carrier 21 and provided with a weight 35, adjustable upon the lever by means of a set-screw 36. An arm 37 rises from the inner portion of the lever, and a link 38 is pivoted to the upper end of the arm and also pivotally connected to the sleeve 28, as indicated at 39 in Fig. 4 of the drawings, at a point substantially midway between the opposite ends of the cam 30. Moreover, the weighted lever 34 rests against the ring 40 as a stop, and the ring 40 loosely embraces the head of the tower and is in turn supported upon perforate ears or projections 41, extending radially outward from the head 2. Pendent rods 42 extend from the ring 40 and work through the perforations in the respective guide projections 41, the lower end portions of the rod 42 being converged and connected to a smaller lower ring 43, which loosely receives the shaft 6 and is capable of sliding vertically thereon. A forked lever 44 is fulcrumed upon a cross-bar 45, carried by adjacent standards of the tower, with its forked end embracing the collar or ring 43 and pivotally connected thereto by means of headed fastenings 46, passing through slots 47 in the ends of the fork. A wire or cable 48 depends from the outer end of the lever 44 for convenience in manipulating the latter from the ground or other point remote from the window. When it is desired to throw the wheel out of operation, the connection 48 is pulled down, so as to elevate the inner end of the lever, thereby elevating the shifting slide, composed of the upper and lower rings 40 and 43 and the connecting-rods 42, the elevation of the ring 40 operating to swing the lever 34 upwardly, and through the medium of the arm 37 and the link 38 the sleeve 28 is rotatably shifted one-fourth of a revolution, thereby to bring the cam 30 into engagement with the two active blades, so as to feather the same, and thereby render the wheel inactive. The two other blades do not need to be feathered by the cam, for the reason that the action of the wind against the front sides thereof will tilt them into substantially horizontal positions edgewise to the wind without the aid of the cam. So long as the cam-shifting means remains in its elevated position the wheel will be inactive; but just as soon as said means is lowered to its normal position the weighted lever 34 will gravitate to its normal position, thereby rotatably shifting the cam back to its original position, whereupon the two active blades will be released so as to return to their original upright positions, and the wheel will then be in operative condition. When the wheel is in operative condition and the direction of the wind changes, the vane 26 will of course automatically trail into the path of the wind, and as the vane is connected to the carrier 21 the latter will be rotatably shifted with the vane, and the sleeve 28, with its cam 30, will also be simultaneously shifted therewith through the connection afforded by the lever 34, the arm 37, and the link 38, whereby the cam 30 maintains its original relation with respect to the vane, and therefore the blades will be properly feathered in accordance with the new direction of the wind.

It will here be noted that while the sleeve 28 and the carrier 21 are simultaneously shifted with the vane the sleeve 28 is capable of being independently shifted when it is desired to throw all of the blades into feathered or inactive positions without necessitating a change in the position of the vane.

Having fully described the invention, what is claimed is—

1. In a windmill, the combination with a wind-wheel having radial tiltable blades, of a trip located in a portion of the path of the blades for contact thereby to feather the blades when coming into the wind, and means to rotatably shift the trip device about the axis of the wheel as a center into engagement with the active blades of the wheel to feather the same and render the wheel inactive.

2. In a windmill, the combination with a wind-wheel having vertically-tiltable blades, of an arcuate trip disposed in a portion of the path of the blades to tilt and thereby feather the same when coming into the wind, said trip having an upwardly-inclined initial portion and a substantially horizontal portion leading therefrom, and means to rotatably shift the trip around the axis of the wheel as a center to bring the trip into engagement with the active blades of the wheel to feather the same and render the wheel inactive.

3. In a windmill, the combination with a wind-wheel having tiltable blades, of a trip located in a portion of the path of the blades to tilt and thereby feather the same when coming into the wind, said trip capable of being rotatably shifted about the axis of the wheel as a center into engagement with the active blades of the wheel to feather the same and render the wheel inactive, and means for rotatably shifting the trip consisting of a tensioned device connected to the trip and means for rotatably shifting the trip in opposition to the tensioned device.

4. In a windmill, the combination with a wind-wheel having tiltable blades, of a trip located in a portion of the path of the blades to tilt and thereby feather the same when coming into the wind, said trip capable of being rotatably shifted about the axis of the wheel as a center to engage and feather the active blades of the wheel to render the latter inactive, and means to shift the trip consisting of a tensioned lever fulcrumed independently of the trip, an arm carried by and projected laterally from the lever, a link extending between the arm and the trip, and means to move the lever against the tension thereof to rotatably shift the trip.

5. In a windmill, the combination with a support, of a wind-wheel mounted thereon and provided with tiltable blades a trip located in a portion of the path of the blades to tilt and thereby feather the same when coming into the wind, said trip capable of being rotatably shifted around the axis of the wheel as a center to engage and feather the active blades of the wheel, a tensioned lever fulcrumed upon the support, a connection between the lever and the trip to impart a rotary movement to the latter by a movement of the lever, a slide carried by the support and disposed to engage and move the lever, and means to operate the slide.

6. In a windmill, the combination with a support, of a wind-wheel having tiltable blades, a trip located in a portion of the path of the blades to tilt and thereby feather the same when coming into the wind, a trip-support rotatable upon the axis of the wheel as a center, a tensioned lever fulcrumed upon the support, a lateral arm carried by the lever, a link extending between the arm and one side of the rotary trip-support, a slide carried by the support and capable of movement into engagement with the lever to move the same, and means to actuate the slide.

7. In a windmill, the combination with a support and a vertical rotary shaft carried thereby, of a wind-wheel carried by the shaft and having tiltable blades, a trip located in a portion of the path of the blades to tilt and thereby feather the same when coming into the wind, a trip-supporting sleeve rotatably embracing the shaft, a tensioned lever fulcrumed upon the support, a connection between the lever and the rotary trip-support to impart a rotary movement to the trip-support by a movement of the lever, and means to move the lever against the tension thereon for shifting the trip.

8. In a windmill, the combination with a support, of a vertical rotary shaft carried thereby, a wind-wheel carried by the shaft and having tiltable blades, an arcuate trip embracing the shaft as a center and located in a portion of the path of the blades to tilt and thereby feather the same when coming into the wind, a sleeve rotatably embracing the shaft and supporting the trip, a gravity-lever fulcrumed upon the support, a connection between the lever and the sleeve to rotatably shift the same by an upward movement of the lever, and means to elevate the lever and thereby shift the trip.

9. In a windmill, the combination with a support and a rotatably vertical shaft carried thereby, of a wind-wheel carried by the shaft and having tiltable blades, a trip located in a portion of the path of the blades to tilt and thereby feather the same when coming into the wind, a rotatably-shiftable sleeve embracing the shaft and supporting the trip, a gravity-lever fulcrumed upon the support, a connection between the lever and the sleeve to rotatably shift the same by an elevation of the lever, a vertically-movable slide carried by the support and capable of contact with the lever to elevate the same, and a controlling-lever fulcrumed upon the support and connected to the slide.

10. In a windmill, the combination of a wind-wheel having tiltable blades, an arcuate trip located in a portion of the path of the blades to tilt and thereby feather the same when coming into the wind, a vane connected to the trip for rotatably shifting the same about the axis of the wheel as a center and thereby maintain a predetermined relation between the trip and the vane, and means to rotatably shift the trip independently of the movement of the vane to bring the trip into contact with the active blades of the wheel to trip and thereby feather the same to render the wheel inactive.

11. In a windmill, the combination with an upright rotary shaft and a wind-wheel carried thereby and provided with tiltable blades, of a carrier member rotatable concentrically upon the shaft, a vane carried by the carrier to rotatably shift the latter, a trip located in a portion of the path of the blades to tilt and thereby feather the same when coming into the wind, said trip being rotatably supported upon the carrier member, and means mounted upon the carrier member and connected to the trip to rotatably shift the same independently of the carrier and bring the trip into contact with the active blades to feather the same and render them inactive.

12. In a windmill, the combination with a vertical rotary shaft and a wind-wheel carried thereby and provided with tiltable blades, of a rotatably-shiftable carrier embracing the shaft, a vane connected to the carrier for shifting the same therewith, a trip located in a portion of the path of the blades to tilt and thereby feather the same when coming into the wind, said trip being rotatably supported upon the carrier, a lever fulcrumed upon the carrier, a connection between the lever and the trip to rotatably shift the latter upon the carrier and bring the trip into contact with the blades to feather the same and render them inactive, and controlling means for the lever to rotatably shift the trip independently of the vane.

13. In a windmill, the combination with a tower and a vertical rotary shaft, of a wind-wheel carried by the shaft and provided with tiltable blades, a tubular carrier rotatably embracing the shaft and supported upon the tower and provided with an external annular flange, a vane carried by the flange to rotatably shift the carrier, a sleeve rotatably embracing the carrier and supported upon the flange thereof, a trip carried by the sleeve and located in a portion of the path of the blades to tilt and thereby feather the same when coming into the wind, and means to rotatably shift the sleeve upon the carrier consisting of a tensioned lever fulcrumed upon the flange of the carrier a connection between the lever and the sleeve to rotatably shift the latter by a movement of the lever, and controlling means to move the lever against the tension thereof.

14. In a windmill, the combination with an upright rotary shaft and a wind-wheel carried thereby and provided with tiltable blades, of a tubular carrier rotatably shiftable upon the shaft, a vane connected to the carrier to shift the same therewith, a sleeve rotatably embracing the carrier and supported thereon, an arcuate trip carried by the sleeve and disposed in a portion of the path of the blades to tilt and thereby feather the same when coming into the wind, a tensioned lever fulcrumed upon the carrier, a lateral arm carried by the lever, a link extending between the arm and the sleeve at a point upon the opposite side of the axis thereof, and means to move the lever against the tension thereon to rotatably shift the trip and bring the same into engagement with the active blades to feather the same and render them inactive.

15. In a windmill, the combination with an upright rotary shaft having a wind-wheel provided with tiltable blades, of a carrier rotatably embracing the shaft, a vane carried by the carrier to shift the same therewith, an arcuate trip rotatably supported upon the carrier and located in a portion of the path of the blades to tilt and thereby feather the same when coming into the wind, a tensioned lever fulcrumed upon the carrier a connection between the lever and the trip to rotatably shift the latter upon the carrier by a movement of the lever, a vertically-slidable ring capable of engagement with the lever to move the same against the tension of the lever, and means to actuate the ring.

16. In a windmill, the combination with an upright rotary shaft having a wind-wheel provided with tiltable blades, of a carrier rotatably embracing the shaft, a vane carried by the carrier to shift the same therewith, an arcuate trip rotatably supported upon the carrier and located in a portion of the path of the blades to tilt and thereby feather the same when coming into the wind, a tensioned lever fulcrumed upon the carrier, a connection between the lever and the trip to rotatably shift the latter upon the carrier by a movement of the lever, and lever-actuating means having a portion extending throughout the entire rotary path of the lever to operate the latter in any position thereof.

17. In a windmill, the combination with a tower, a vertical rotary shaft, and a wind-wheel carried by the shaft and having tiltable blades, of a carrier supported upon the tower and rotatably shiftable upon the shaft, a vane carried by the carrier to rotatably shift the same, a trip rotatably shiftable upon the carrier and located in a portion of the path of the blades to tilt and thereby feather the same when coming into the wind, a tensioned lever fulcrumed upon the carrier, a connection between the lever and the trip to rotatably shift the latter by a movement of the lever to bring the trip into engagement with the active blades of the wheel to feather the same and render them inactive, a vertically-movable ring carried by the tower and constituting a support for the lever in any position thereof, and means to elevate the ring and actuate the lever.

18. In a windmill, the combination with a tower having a cap provided with radial perforate projections, of an upright rotary shaft piercing the cap, a wind-wheel carried by the shaft above the top of the tower and provided with tiltable blades, a carrier supported upon the cap and rotatably embracing the shaft, a vane carried by the carrier to shift the same therewith, a trip rotatably supported upon the carrier and located in a portion of the path of the blades to tilt and thereby feather the same when coming into the wind, a vertically-movable ring normally supported upon the perforate ears of the cap, rods working through the perforate ears and connected to the ring, means mounted upon the tower and connected to the rods to elevate the ring, a tensioned lever fulcrumed upon the carrier and supported upon the ring, and a connection between the lever and the trip to rotatably shift the latter upon the carrier by an upward movement of the lever to bring the trip into engagement with the active blades of the wheel and render the same inactive.

19. In a windmill, the combination with an upright rotary shaft having radial arms located below the top thereof, of blades swung upon the arms and projected at opposite sides thereof, each blade having its greater portion normally depending from its arm, and braces extending from the shaft above the blades to the arms and lying in the path of the tiltable movements of the upper portions of the blades to limit said movements.

In testimony that I claim the foregoing as my own I have hereto affixed my signature in the presence of two witnesses.

OWEN W. KENWORTHY.

Witnesses:
J. F. MOOTHART,
W. A. DAVIS.